(12) United States Patent
Johnson et al.

(10) Patent No.: US 9,487,657 B2
(45) Date of Patent: Nov. 8, 2016

(54) HIGH TRANSPARENCY PIGMENTS

(75) Inventors: Mark W. Johnson, Goose Creek, SC (US); Gregory R. Schulz, Reading, MA (US)

(73) Assignee: Sun Chemical Corporation, Parsippany, NJ (US)

( * ) Notice: Subject to any disclaimer, the term of this patent is extended or adjusted under 35 U.S.C. 154(b) by 511 days.

(21) Appl. No.: 12/374,515

(22) PCT Filed: Aug. 16, 2007

(86) PCT No.: PCT/US2007/076138
§ 371 (c)(1),
(2), (4) Date: Jan. 21, 2009

(87) PCT Pub. No.: WO2008/022280
PCT Pub. Date: Feb. 21, 2008

(65) Prior Publication Data
US 2009/0326105 A1     Dec. 31, 2009

Related U.S. Application Data

(60) Provisional application No. 60/822,858, filed on Aug. 18, 2006.

(51) Int. Cl.
| C09D 11/037 | (2014.01) |
| C09B 5/62 | (2006.01) |
| C09B 67/00 | (2006.01) |
| C09B 67/04 | (2006.01) |
| C09B 67/20 | (2006.01) |
| C09B 67/46 | (2006.01) |
| C09D 11/101 | (2014.01) |
| C09D 11/322 | (2014.01) |
| C09D 17/00 | (2006.01) |
| B01F 17/00 | (2006.01) |

(52) U.S. Cl.
CPC ......... *C09B 67/0002* (2013.01); *C09B 67/009* (2013.01); *C09B 67/0022* (2013.01); *C09B 67/0063* (2013.01); *C09D 11/037* (2013.01); *C09D 11/101* (2013.01); *C09D 11/322* (2013.01); *C09D 17/003* (2013.01); *B01F 17/005* (2013.01)

(58) Field of Classification Search
CPC .... C09B 5/62; C09B 67/022; C09B 67/0002
USPC .................................................... 524/88, 90
See application file for complete search history.

(56) References Cited

U.S. PATENT DOCUMENTS

| 3,157,659 A | 11/1964 | Deuschel et al. |
| 3,256,285 A | 6/1966 | Fuchs et al. |
| 3,257,405 A | 6/1966 | Gerson et al. |
| 3,317,539 A | 5/1967 | Jaffe |
| 4,158,572 A | 6/1979 | Blackburn et al. |
| 4,257,951 A | 3/1981 | Matrick |
| 4,631,330 A | 12/1986 | Dietz et al. |
| 4,732,618 A | 3/1988 | Spietschka et al. |
| 4,844,742 A | 7/1989 | Jaffe |
| 5,066,687 A | 11/1991 | Rieper et al. |
| 5,175,282 A | 12/1992 | Roth et al. |
| 5,264,316 A * | 11/1993 | Yamada ................ G03F 7/002 430/138 |
| 5,348,580 A * | 9/1994 | Chassot ............ C09B 67/0063 106/410 |
| 5,629,367 A * | 5/1997 | Lofftus et al. .................. 524/88 |
| 5,843,220 A * | 12/1998 | Babler ..................... C09C 3/041 106/31.6 |
| 6,063,182 A | 5/2000 | Babler |
| 6,099,895 A | 8/2000 | Mayo et al. |
| 6,136,890 A * | 10/2000 | Carlson et al. ............... 523/160 |
| 6,391,104 B1 * | 5/2002 | Schulz ............... C09B 67/0034 106/494 |
| 6,440,207 B1 * | 8/2002 | Schulz ............... C09B 67/0002 106/412 |
| 6,692,562 B2 * | 2/2004 | Schulz ........................ 106/494 |
| 7,323,046 B1 * | 1/2008 | Wolf et al. ................... 106/413 |
| 2003/0167971 A1 * | 9/2003 | Schulz ..................... C09B 5/62 106/494 |
| 2004/0097685 A1 | 5/2004 | Bruchmann |
| 2004/0260013 A1 * | 12/2004 | Richards ............... B01F 17/005 524/589 |
| 2005/0004284 A1 | 1/2005 | Koenemann |
| 2008/0214729 A1 * | 9/2008 | Buter ................. C08G 18/0823 524/591 |

FOREIGN PATENT DOCUMENTS

| DE | 2331792 | 1/1975 |
| DE | 102005005846 | 8/2006 |
| EP | 0270126 | 6/1988 |
| EP | 0335197 | 10/1989 |
| GB | 1111223 | 4/1968 |
| GB | 1445135 | 8/1976 |
| GB | 1502884 | 3/1978 |
| JP | 06212088 A * | 8/1994 |
| NL | WO 2007/057326 A1 * | 5/2007 ............... C08J 3/12 |
| WO | WO-03057783 | 7/2003 |

OTHER PUBLICATIONS

Machine translated English language equivalent of JP 06212088 (Aug. 1994, 6 pages).*
International Search Report for PCT/US2007/076138 dated Feb. 27, 2008.

* cited by examiner

*Primary Examiner* — Brieann R Fink
(74) *Attorney, Agent, or Firm* — Frost Brown Todd LLC

(57) ABSTRACT

The present invention provides a method for preparing conditioned pigments that have smaller diameter and increased color strength, masstone and travel by milling pigment with a dispersant comprising polyurethane. Further, the invention provides the conditioned pigments prepared by the method of the invention and their applications to paints, coatings, inks, plastics, optical devices, color filters and so forth.

19 Claims, No Drawings

HIGH TRANSPARENCY PIGMENTS

FIELD OF THE INVENTION

This invention relates to high transparency pigments incorporating polyurethane dispersants, a method for producing same and applications thereof.

BACKGROUND OF INVENTION

During the manufacture of pigmented coatings or inks, the most labor intensive and time consuming step is the formation of the pigment dispersion. This is especially true with very transparent coatings using organic pigments for waterborne systems, which require extended milling times to reduce pigment particle sizes. In addition, the resulting pigment must be easily dispersible in systems, particularly in stir-in systems.

Many dispersants have been developed to help minimize milling time and stabilize pigment dispersions. Such dispersants range from low molecular weight surfactants to high molecular weight polymers. Among the more efficient polymeric dispersants are those based on polyurethane. The chemistry of the polyurethane dispersants has been extensively modified to include non-ionic, anionic, and cationic types. Many of these work well to stabilize liquid pigment dispersions, but not much has been explored to use polyurethane dispersants for the surface treatments of dry pigments. GB 1111223 discloses a colored polyurethane elastomeric particle, which is formed in the presence of a pigment and is applicable for non-transparent paints. U.S. Pat. No. 4,844,742 discloses polyurethane dispersants (Byk 160), which are designed for solvent-borne paints and used as pigment surface treatments; however, additional milling is still required to prepare a dispersion. Similarly, U.S. Pat. No. 4,631,330 uses a solvent solution of polyurethane to surface-treat a pigment, which is then dried. Although this preparation disperses the pigment well in an alkyd-melamine solvent-borne coating, some additional milling is still required to prepare the paints. U.S. Patent Application Publication Nos. 2004/097685 and 2005/004284 disclose polyurethane polymers which work well in water-borne coatings, but some additional milling is still required to prepare the paints. U.S. Pat. No. 6,063,182 discloses stir-in compositions with relatively opaque pigments, using polymers or co-polymers of vinylpyrrolidone, which is subsequently spray dried. These dispersants sometimes have compatibility problems and negatively affect coating properties in some systems. Pigments require high energy in the milling process.

Thus, there exists a need for easily dispersible high transparency pigments.

SUMMARY OF THE INVENTION

The present invention relates to a high transparency pigment that is produced by milling a crude pigment with a dispersant containing polyurethane. The dry pigment compositions comprising the pigment prepared by the method of the present invention are easily dispersible into water-borne paint systems with only minimal stirring or milling. Thus, the present invention provides a method for producing a conditioned pigment comprising (i) milling a crude pigment with a dispersant comprising a polyurethane; and (ii) isolating a resulting pigment slurry. The pigment to be conditioned by the method of the invention may be any type of pigment, including organic pigments and inorganic pigments. In a preferred embodiment, the pigment to be conditioned is an organic pigment.

The present invention further provides a conditioned pigment prepared by the method of the present invention and the pigment compositions comprising the conditioned pigment of the invention. The pigment compositions thus prepared have shown broad compatibility with various water-borne coating systems, including automotive and architectural coating systems. Furthermore, the conditioned pigment of the present invention confers excellent transparency and color values to the coatings, paints, inks, plastics, optical devices, color filters, and the like, when contained therein. Thus, the present invention further provides a coating, paint, ink, plastic composition, color filter, optical device, or the like that comprises the conditioned pigment of the present invention.

DETAILED DESCRIPTION OF THE INVENTION

The present invention generally relates to a method of preparing a high transparency pigment that is conditioned with a dispersant containing polyurethane. Thus, the present invention provides a method for producing a conditioned pigment comprising (i) milling a crude pigment with a dispersant comprising polyurethane; and (ii) isolating a resulting pigment slurry.

Although the pigments to be conditioned by the present method may be any types of pigment, including, but not limited to, organic pigments, inorganic pigments and dyes, the most preferable are organic pigments. Suitable organic pigments include, but are not limited to, quinacridones, quinacridonequinones, perylenes, phthalocyanines, anthraones, isoindolines, dioxazines, triphendioxazines, 1,4-diketopyrrolopyrroles, anthrapyrimidines, anthranthrones, flavanthrones, indanthrones, perinones, pyranthrones, thioindigos, 4,4'-diamino-1,1-dianthraquinonyl, azo compounds, and the like, as well as substituted derivatives thereof and mixtures thereof, including solid solutions. Among those, preferred crude organic pigments are those that, once conditioned, lead to the high performance pigments, such as perylenes, quinacridones, phthalocyanines, 1,4-diketopyrrolopyrroles, isoindolines, anthrones, quinacridonequinones, and dioxazine pigments. These pigments may be used as crude pigments that have not been modified after chemical synthesis, or as pigments that have been conditioned or otherwise treated by methods other than the process of the present invention.

Especially preferred crude organic pigments are perylenes, quinacridones, phthalocyanines, 1,4-diketopyrrolopyrroles and isoindolines. Perylene pigments used in the process of the present invention may be unsubstituted or substituted, for example, at imide nitrogen atoms, with any substituents including, but not limited to, an alkyl group of 1 to 10 carbon atoms, an alkoxy group of 1 to 10 carbon atoms, a halogen (such as chlorine, fluorine, and so forth), or other substituents typical for perylene pigments, or combinations thereof. Substituted perylenes may contain one or more of any one substituent. Among perylene pigments, diimides and dianhydrides of perylene-3,4-9,10-tetracarboxylic acid are especially preferred.

Crude perylenes can be prepared by any methods known in the art. (see, for example, by W. Herbst and K. Hunger, *Industrial Organic Pigments*, New York; VCH Publishers, inc. 1993, pp. 9 and 467-475; by H. Zollinger, *Color Chemistry*, VCH Verlagsgessellschaft, 1991, pp. 227-228 and 297-298; and by M. A. Perkins, "Pyridines and Pyridones" in *The Chemistry of Synthetic Dyes and Pigments*, ed. H. A. Lubs, Malabar, Fla.: Robert E. Krieger Publishing Company, 1955, pp. 481-481).

Quinacridone pigments suitable for the present invention include unsubstituted or substituted quinacridones, for example, with one or more alkyl, alkoxy, halogens such as chlorine, or other substituents typical of quinacridone pigments. The quinacridone pigments may be prepared by any methods known in the art but are preferably prepared by thermally ring-closing various 2,5-dianilinoterephthalic acid precursors in the presence of polyphosphoric acid (see, for example, by S. S. Labana, "Quinacridones" in *Chemical Review*, 67, 1-18 (1967); U.S. Pat. Nos. 3,157,659; 3,256,285; 3,257,405; and 3,317,539).

Phthalocyanine pigments, especially metal phthalocyanines may be also used in the practice of the present invention. Although copper phthalocyanines are preferred, other metal-containing phthalocyanine pigments, such as those based on zinc, cobalt, iron, nickel, and other such metals, may also be used. Phthalocyanine pigments may be unsubstituted or partially substituted, for example, with one or more alkyl (having 1 to 10 carbon atoms), alkoxy (having 1 to 10 carbon atoms), halogens such as chlorine, or other substituents typical of phthalocyanine pigments. Crude phthalocyanines may be prepared by any methods known in the art, but are preferably prepared by a reaction of phthalic anhydride, phthalonitrile, or derivatives thereof, with a metal donor, a nitrogen donor (such as urea or the phthalonitrile itself, and optionally a catalyst, preferably in an organic solvent (see by W. Herbst and K. Hunger, *Industrial Organic Pigments*, New York: VCH Publishers, Inc., 1993, pp. 418-427; by H. Zollinger, *Color Chemistry* (VCH Verlagsgessellschaft, 1991, pp. 101-104; and by N. M. Bigelow and M. A. Perkins, "Phthalocyanine Pigments" in *The Chemistry of Synthetic Dyes and Pigments*, ed. H. A. Lubs, Malabar, Fla.: Robert E. Krieger Publishing Company, 1955, pp. 584-587; see also U.S. Pat. No. 4,158,572; U.S. Pat. Nos. 4,257,951; and 5,175,282; and British Patent 1,502,884).

Suitable inorganic pigments include, but are not limited to, oxides such as titanium dioxides, iron oxides, ferric oxide blacks, chromium oxides, ferric ammonium ferrocyanides, black iron oxides, carbon blacks, and the like.

Suitable starting pigments may include pigments having large particle sizes that do not exhibit good dispersibility or coloristic properties. The process of the present invention can be used to convert such large-particle pigments into readily dispersible forms. Suitable starting pigments may also include pigments that have smaller particles but are aggregated and, therefore, do not exhibit optimum dispersibility or color properties. For example, many processes that reduce particle sizes, such as dry milling (e.g., jet milling, ball milling, and the like), can produce aggregates having poor dispersibility. In such cases, the process of the present invention can be used to convert aggregated pigments into readily dispersible forms.

The method of the present invention comprises two steps: (i) milling a crude pigment with a dispersant comprising polyurethane; and (ii) isolating a resulting pigment slurry. In the milling step, a pigment is present in an amount of about 5 wt. % to about 99 wt. %, preferably about 10 wt. % to about 40 wt. %, and most preferably about 15 wt. % to about 30 wt. %, based on the total weight of the milling mixture. The concentration of the polyurethane dispersant is usually at least about 1% by weight relative to the pigment, but is preferably about 1 to 100% by weight, more preferably about 10 to 50% by weight, and most preferably about 20 to 45% by weight. The polyurethane dispersant may be any known polyurethane compositions, including modified polyurethanes. Suitable polyurethanes may be of any molecular weight that will prove useful in dispersing pigment particles, including but not limited to those in the range of about 1,000 to about 100,000, preferably less than 50,000 molecular weight. Also suitable are commercially available polyurethane dispersants, for example, Borchigen SN-95 by Lanexess, Pittsburg, Pa.

The milling may occur in any conventional mill, including but not limited to milling with bead mill, media mill, three roll mill, and the like. Although the particular milling apparatus is generally not critical, suitable mills include horizontal mills (for example, Eiger mills, Netzsch mills, and Super mills), vertical mills, ball mills, three roll mills, attritors, vibratory mills, and the like containing various grinding media. Suitable grinding media include salt; sand; glass beads, such as barium titanate, soda lime, or borosilicate; ceramic beads, such as zirconia, zirconium silicate, and alumina beads; metal beads, such as stainless steel, carbon steel, and tungsten carbide beads; and so forth. Regardless of the particular milling method used, the mixture of the pigment, the polyurethane dispersant, and the optional components is milled until the desired particle size and particle distribution are obtained. The milled pigment, depending on the end application, should have an average particle size of about 30 nm to about 500 nm, preferably about 60 nm to about 300 nm, and most preferably about 75 nm to about 200 nm. Depending on the specific mill used, milling is generally carried out at a temperature of about 0° C. to about 75° C., preferably about 15° C. to about 45° C. Milling times generally depend on the quantities being milled and the volume of the mill. The milling may be conducted optionally in the presence of milling liquid, or one or more milling additives, including rheological additives, or both. Suitable milling liquid include water or any water-miscible solvent, including, but not limited to, lower aliphatic alcohols, such as methanol; ketones and ketoalcohols, such as acetone, methyl ethyl ketone and diacetone alcohol; amides, such as dimethylformamide and dimethylacetamide; ethers, such as tetrahydrofuran and dioxane; alkylene glycols and triols, such as ethylene glycol and glycerol; and other organic liquids known in the art and mixtures thereof. Suitable additives include, but not limited to, organic pigment derivatives, uncolored additives, surface modification reagents, rheology improving agents, texture improving agents, wetting agents, particle growth inhibitors, crystal phase directors, antiflocculants, defoamers and the like. The rheology additive or any combination thereof may be added at any time during the milling including before the pigment is added to the mill, after the pigment is added, or after the polyurethane dispersant is added to the mill. The additive may be present in an amount of about 0.1 wt. % to about 50 wt. %, preferably about 0.1 wt. % to about 10 wt. %, based on the total weight of the pigment.

In general, the components of the milling mixture may be added or combined in any order, but preferably, but not necessarily, all the components are present at the start of the milling such that the total solid contents in the milling mixture is at least about 10% by weight, preferably about 20% to about 50% by weight.

In the present invention, the resulting milled slurry prior to drying has greater than 20% total pigment and resin solids. Even at solids of greater than 30%, the resulting milled slurry can be milled without incurring any viscosity problems such as drop in milling efficiency, pluggage of the mill, etc. The second step of the invention is to dry the resulting slurry pursuant to any suitable drying method such as spray-drying, freeze drying, air drying, oven drying and the like, preferably spray-dried.

After the milling is completed, the resultant pigment may be separated from the milling mixture by one or more isolation methods known in the art, preferably methods that do not involve formation of a wet filtercake or presscake.

Particularly suitable methods for collecting highly dispersible pigments of the invention include spray drying and lyophilization. It is generally less preferable to collect the pigment by filtration, tray drying, spin flash drying, centrifugation, or decantation.

The conditioned pigment of the present invention provides much better dispersions at higher solids and "problem-free" millings compared to the current art. In addition to resulting in a better problem-free milling, polyurethane dispersants used in the invention have been surprisingly found to be more efficient at dispersing the pigment, thus achieving short milling time and costs. The pigment may be added to a paint system, wherein the paint system has a higher pigment loading, without a concomitant increase in viscosity.

The conditioned pigment of the present invention has improved color strength, masstone and travel. Pigments prepared according to the present invention are suitable for use in a variety of pigment applications, particularly in view of their excellent dispersibility as well as their light stability and migration properties. The conditioned pigment can be used in a variety of applications such as paint systems, inks, coatings, and the like. If the application is for paints then such include automotive paints, water based paint systems, solvent based paint systems, emulsion paints, stir-in paint systems, electronic coating paints, lacquers, enamels, reactive paints, multi-component paints and the like. The conditioned pigment can be used in inks including but not limited to printing inks, water based inks, solvent based inks, energy curable inks, ink jet inks and the like. The conditioned organic pigment may also be used in coatings including but not limited to water based coatings and aqueous coatings, solvent based coatings, energy curable coatings and the like. The conditioned pigments can be used in dispersions and pastes and even in other vehicles such as cement and the like. Other uses include but are not limited to plastics such as polyvinyl chloride, polyvinyl acetate, and polyvinyl propionate; polyolefins, such as polyethylene and polypropylene and the like. Polymers may also incorporate the conditioned pigment of the present invention including but not limited to high molecular weight polyamides, polymers and copolymers of acrylates, methacrylates, acrylonitrile, acrylamide, butadiene, styrene, polyurethanes, polycarbonates and the like. Other suitable uses include rubbers and cellulose such as acetyl cellulose, cellulose butyrate, or viscose in addition to other polymers, polyaddition products, polycondensates and the like. Materials containing conditioned pigments of the present invention may have any desired shape or form, including molded articles, films, and fibers. Furthermore, the conditioned pigment of the present invention can also be used in optical devices, such as color filters, LCD panels and the like.

The conditioned pigment of the present invention is further illustrated by the following non-limiting examples in which all parts and percentages are by weight, unless otherwise indicated.

EXAMPLE 1

A pigment of the present invention was produced by slurrying a crude PR 179 presscake (150 g dry content; 446.83 g) with a polyurethane dispersant (90 g; 22.5 g active; 15% on pigment; Borchigen SN-95, manufactured by Lanxess, of Pittsburg, Pa.). The slurry was media milled at 4000 rpm for 5 hours. About 20 minutes into the milling, the slurry began to thicken and the pH was adjusted with about 1 g of AMP-95 (2-amino-2-methyl-1-propanol, available from Angus Chemical). At about 3 hours, the slurry thickened again and the pH was adjusted once again and additional polyurethane dispersant was added (1 g of AMP-95 and 28 g of Borchigen SN-95 at 7 g active bringing the total resin content to 19.66% active on pigment). The final slurry solids were 29.41% of total pigment and resin. The slurry spray dried to give 153.10 g dry powder.

The pigment was tested for color strength, transparency, hue and chroma in a water-based paint tests using a waterborne basecoat/solvent-borne clearcoat paint system. Aqueous dispersions were prepared using a mixture of 12.4% AROLON® 559-G4-70 acrylic resin (Reichhold Chemicals, Inc.), 3.2% SOLSPERSE® 27000 hyperdispersant (Zeneca, Inc.), 1.6% 2-amino-2-methyl-1-propanol (Angus Chemical), and 18% conditioned organic pigment which gave a pigment-to-binder ratio of 3:2 and a total solids content of 30%. The pigment-to-binder ratio was then reduced to 1:4 with additional AROLON® 559-G4-70 acrylic resin (total amount 26%) and 25% CYMEL® 325 melamine/formaldehyde resin (Cytec Industries), which gave a total solids content of 50%. Masstone and transparency measurements were made using films applied at 76 µm and 38 m wet film thickness, respectively, and allowed to stand at room temperature for fifteen minutes and at 100° C. for five minutes. Clearcoats containing a mixture of 80% of AROPLAZ® 1453-X-50 alkyd resin (Reichhold Chemicals, Inc.) and 20% CYMEL® 325 melamine/formaldehyde resin at a total solids level of 57% were then applied over the basecoat at a 76 µm wet film thickness and allowed to stand at room temperature for fifteen minutes and at 121° C. for fifteen minutes.

Undertone tint paints were prepared from the reduced aqueous dispersions described above having a pigment-to-binder ratio of 1:4 by adding additional AROLON® 559-G4-70 acrylic resin, CYMEL® 325 melamine/formaldehyde resin, and 35% TINT-AYD® CW-5003 white dispersion (Daniel Products Company), which gave a pigment-to-binder ratio of 1:1.1, a total solids content of 55%, and a $TiO_2$-to-pigment ratio of 9:1. Color measurements were made using films applied at 38 µm wet film thickness and allowed to stand at room temperature for fifteen minutes and at 100° C. for five minutes. Clearcoats were then applied and baked as described above.

Metallic paints were prepared from the dispersion described above having a pigment-to-binder ratio of 3:2 using a water-dispersible aluminum pigment (available as HYDRO PASTE® 8726 from Silberline Manufacturing Co., Inc.), AROLON® 559-G4-70 acrylic resin, and CYMEL® 325 melamine/formaldehyde resin in quantities that provided a pigment-to-binder ratio of 1:2, an aluminum-to-pigment ratio of 1:4, and a total solids content of 43%. Color measurements were made using films applied at 38 µm wet film thickness and baked as described above. Clearcoats were then applied and baked as described above.

The coloristic values for paints containing the conditioned organic pigments were obtained on a CS-5 Chroma Sensor spectrometer from Datacolor International using a D65 illuminant at an angle of 10 degrees. All values for ΔL, ΔH, ΔC, and transparency were measured relative to corresponding organic pigment that has not been treated with a polyurethane based dispersant. Positive values for ΔL, ΔH, ΔC, and transparency correspond to lighter, yellower, more chromatic, and more transparent samples, respectively. Subjective qualitative evaluations of flop were determined by a skilled observer.

The transparency data were measured using contrast ratios (white/black) on a Leneta drawdown panel. The results of the inventive pigment were compared to a commercial Pigment Red 179 (Sun Chemical code 229-6438) as shown in Table 1.

TABLE 1

| | M.T. | | | 90W | | | | 20Al | | | |
|---|---|---|---|---|---|---|---|---|---|---|---|
| | ΔL | ΔC | Transp/std | ΔL | ΔH | ΔC | Strength % | ΔL | ΔH | ΔC | Strength % |
| Ex. 1 | −1.39 | −7.24 | −10.83/−4.98 | 0.35 | 0.69 | 1.30 | 97.33 | 2.54 | 1.06 | 7.61 | 104.98 |

EXAMPLE 2

A pigment of the present invention was produced by slurrying a crude PR 179 presscake (500 g dry content; 1489.4 g) with a polyurethane dispersant (100 g active; 20% on pigment; 400 g Borchigen SN-95). The slurry was media milled at 2000 rpm for 5 hours to a diameter having a laser scattering endpoint of 87.5 nm.

The diameter was measured by placing 10 drops of milled pigment slurry in a clean container filled with 30 ml of de-ionized water (≤0.2 μS) and sonicating the contents of the container for 1 minute at 300 watts using an ultrasonic processor (Cole-Palmer Ultrasonic Homogenizer 4710 Series). A clean sample cell was then rinsed with de-ionized water three times and filled with de-ionized water. The sonicated sample was dropped one drop at a time until reaching a count rate of the 15-30 kCps. The instrument used to measure the particle size was a Helium Neon Laser with a 633 nm wavelength with a Bertan High Voltage power supply used in the kV position with the voltage adjusted to 1.75. A decahydronaphtalene vat bath held the sample cell and the temperature of the vat bath was measured and entered in measurement parameters. The measurement parameters were: (a) temperature from the vat bath; (b) suspension: aqueous; (c) detection angle of 90.00°;(d) wavelength of 632.8 nm; and (e) run duration of 2 minutes×5 runs.

The final slurry solids were 31.33% of total resin and pigment. The slurry was discharged from the mill and spray dried to yield 487.94 g dry powder.

The pigment was tested and measured in a waterborne basecoat/solvent-borne clearcoat paint system according to the procedure in Example 1. The results are set forth below in Table 2.

TABLE 2

| | M.T. | | | 90W | | | | 20Al | | | |
|---|---|---|---|---|---|---|---|---|---|---|---|
| | DL | DC | Transp/std | DL | DH | DC | % Strength | DL | DH | DC | % Strength |
| Example 2 | −0.70 | −4.01 | −7.81/−5.35 | 0.25 | 0.20 | 0.75 | 95.27 | 1.15 | 0.20 | 4.20 | 102.47 |

EXAMPLE 3

A pigment of the present invention was produced by slurrying a crude PR 179 presscake (500 g dry content; 1517 g.) with a polyurethane dispersant (75 g active; 15% on pigment; 300 g. Borchigen SN-95) and aqueous ammonia (about 3 g.). The slurry was media milled at 2000 rpm for 5 hours to a laser scattering endpoint of 82.3 nm. The final slurry solids were 29.5% total pigment and resin. The slurry was discharged from the mill and spray dried to yield 515 g dry powder.

The pigment was tested and measured in a waterborne basecoat/solvent-borne clearcoat paint system according to the procedure in Example 1. The results are set forth below in Table 3.

TABLE 3

| | M.T. | | | 90W | | | | 20Al | | | |
|---|---|---|---|---|---|---|---|---|---|---|---|
| | DL | DC | Transp/std | DL | DH | DC | % Strength | DL | DH | DC | % Strength |
| Example 3 | −0.81 | −4.51 | −7.32/−4.42 | 0.40 | 0.31 | 1.14 | 98.29 | 1.35 | 0.46 | 5.03 | 101.10 |

EXAMPLE 4

A pigment of the present invention was produced by slurrying a crude PR 179 presscake (500 g dry content; 1517 g.) with a polyurethane dispersant (50 g active; 10% on pigment; 300 g. Borchigen SN-95) and aqueous ammonia (about 4 g.). The slurry was media milled at 2000 rpm for 5 hours to a laser scattering endpoint of 83.6 nm. The final slurry solids were 26.54% of total resin and pigment. The slurry was discharged from the mill and spray dried.

The pigment was tested and measured in a waterborne basecoat/solvent-borne clearcoat paint system according to the procedure in Example 1. The results are set forth below in Table 4.

TABLE 4

| | M.T. | | | 90W | | | | 20Al | | | |
|---|---|---|---|---|---|---|---|---|---|---|---|
| | DL | DC | Transp/std | DL | DH | DC | % Strength | DL | DH | DC | % Strength |
| Example 4 | −0.92 | −4.90 | −7.47/−4.42 | 0.35 | 0.42 | 1.10 | 103.38 | 1.32 | 0.55 | 4.83 | 101.64 |

EXAMPLE 5

A pigment of the present invention was produced by slurrying a crude PR 122 presscake (400 g dry content; 1394.2 g.) with a polyurethane dispersant (140 g active; 35% on pigment; 300 g. Borchigen SN-95). The slurry was media milled at 2000 rpm for 1 hour to a laser scattering endpoint of 157.6 nm. The final slurry solids were 23.04% of total resin and pigment. The slurry was discharged from the mill and spray dried to yield 437.9 dry powder.

The pigments from Examples 6, 7, and 8 were tested and measured in a latex paint system. Pigment (either that of the foregoing examples or the same dry color without the dispersant, the latter referred to below as "Conventional") was dispersed in a Creanova (Degussa) universal system on a Sherwin-Williams Mini-Mill for 20 minutes with glass beads. ("beads" samples). In a second test of dispersibility, pigment was stirred into the dispersion vehicle using a Dispermat at 5000 rpm for 5 minutes with only a 1.25 inch blade and no glass beads ("stir" samples). Both the "beads" and the "stir" samples were then incorporated into a Benjamin Moore tint base with a brush.

The results are set forth below in Tables 5-8.

TABLE 5

CIE L*a*b* Data For 1% Color/99% White Tints

| Pigment | Strength | ΔH | ΔC | ΔL | ΔE | Δa | Δb |
|---|---|---|---|---|---|---|---|
| Conventional | Std | Std | Std | Std | Std | Std | Std |
| Example 5 | 101.5 | −0.38 | 1.48 | −0.23 | 1.55 | 1.24 | −0.90 |

(ΔH, ΔC, ΔL and ΔE are adjusted to equal strength)

TABLE 6

| Pigment | Strength | ΔH | ΔC | ΔL | ΔE | Δa | Δb |
|---|---|---|---|---|---|---|---|
| Example 5 Bead | Std | Std | Std | Std | Std | Std | Std |
| Example 5 Stir | 99.5 | −0.09 | 0.16 | 0.13 | 0.23 | 0.11 | −0.15 |

TABLE 7

CIE L*a*b* Data For About 50/50 Color/White Tints

| Pigment | Strength | ΔH | ΔC | ΔL | ΔE | Δa | Δb |
|---|---|---|---|---|---|---|---|
| Conventional | Std | Std | Std | Std | Std | Std | Std |
| Example 5 | 97.5 | −3.53 | 1.99 | 1.59 | 4.35 | 2.18 | −3.42 |

(ΔH, ΔC, ΔL and ΔE are adjusted to equal strength)

TABLE 8

| Pigment | Strength | ΔH | ΔC | ΔL | ΔE | Δa | Δb |
|---|---|---|---|---|---|---|---|
| Example 5 Bead | Std | Std | Std | Std | Std | Std | Std |
| Example 5 Stir | 101.1 | 0.74 | −0.59 | −0.48 | 1.06 | −0.61 | 0.73 |

The foregoing Tables demonstrate how easy it is to disperse the treated pigment of the present invention.

Equivalents

Those skilled in the art will recognize, or be able to ascertain many equivalents to the specific embodiments of the invention described herein using no more than routine experimentation. Such equivalents are intended to be encompassed by the following claims. All publications and patents mentioned in this specification are herein incorporated by reference into this specification.

The invention claimed is:

1. A method for producing a conditioned pigment comprising:
   (a) milling a pigment with a dispersant comprising polyurethane having a molecular weight of about 1,000 to about 100,000 to obtain a resulting slurry, wherein at the start of the milling, the milling mixture has a total solids content of about 10 to 50% by weight and the amount of the dispersant is about 1 wt% to 50 wt% based on weight of the pigment; and
   (b) isolating a solid product containing the pigment and the dispersant from the resulting slurry, the solid product being the conditioned pigment;
   wherein the pigment is a perylene.

2. The method of claim 1 wherein the pigment is present in an amount of about 5 wt. % to about 99 wt. % based on the total amount of the milling mixture.

3. The method of claim 1 wherein the polyurethane has a molecular weight of less than 50,000.

4. The method of claim 1 wherein the polyurethane is present in an amount of at least about 10 to 50 wt. % based on the weight of the pigment.

5. The method of claim 1 wherein the isolating step is by spray-drying, freeze drying, air drying or oven drying.

6. A polyurethane-conditioned pigment according to the method of claim 1.

7. The polyurethane-conditioned pigment according to claim 6, wherein the resulting slurry has a total solids above 20% of the pigment and the dispersant.

8. A method for improving color strength of a pigment comprising effecting the method of claim 1 for a sufficient period of time to realize the improved color strength.

9. A method for improving masstone of a pigment comprising effecting the method of claim 1 for a sufficient period of time to realize the improved masstone.

10. A paint comprising the conditioned pigment of claim 1.

11. A coating comprising the conditioned pigment of claim 1.

12. An ink comprising the conditioned pigment of claim 1.

13. A color filter comprising the conditioned pigment of claim 1.

14. An optical device comprising the conditioned pigment of claim 1.

15. A plastic composition comprising the conditioned pigment of claim 1.

16. The method of claim 3 wherein the pigment is present in an amount of about 10 wt. % to about 40 wt. % based on the total amount of the milling mixture, and the milling is effected such that the resulting slurry has a total solids above 20% of the pigment and the dispersant and the pigment has an average particle size of about 30 nm to 500 nm.

17. The method of claim 16 wherein the pigment is present in an amount of about 15 wt. % to about 30 wt. % based on the total amount of the milling mixture, and the milling is effected such that the resulting slurry has a total solids above 30% of the pigment and the dispersant and the pigment has an average particle size of about 60 nm to 300 nm.

18. The method of claim 17 wherein the milling is effected such that the pigment has an average particle size of about 75 nm to 200 nm.

19. The method of claim 16 wherein the milling is effected in the presence of a rheology additive in an amount of about 0.1 wt % to about 50 wt % based on the weight of the pigment.

\* \* \* \* \*